(No Model.)

W. A. GREEN.
NUT LOCK.

No. 581,551. Patented Apr. 27, 1897.

WITNESSES:
Peter Edwards
J R McCance

INVENTOR,
William A. Green
by O. M. Clarke his Att'y.

THE NORRIS PETERS CO., PHOTO-LITHO., WASHINGTON, D. C.

UNITED STATES PATENT OFFICE.

WILLIAM A. GREEN, OF ETNA, PENNSYLVANIA.

NUT-LOCK.

SPECIFICATION forming part of Letters Patent No. 581,551, dated April 27, 1897.

Application filed October 21, 1896. Serial No. 609,627. (No model.)

*To all whom it may concern:*

Be it known that I, WILLIAM A. GREEN, a citizen of the United States, residing at Etna, in the county of Allegheny and State of Pennsylvania, have invented or discovered a new and useful Improvement in Nut-Locks, of which the following is a full, clear, and exact description, reference being had to the accompanying drawings, forming part of this application, in which—

Figure 1:
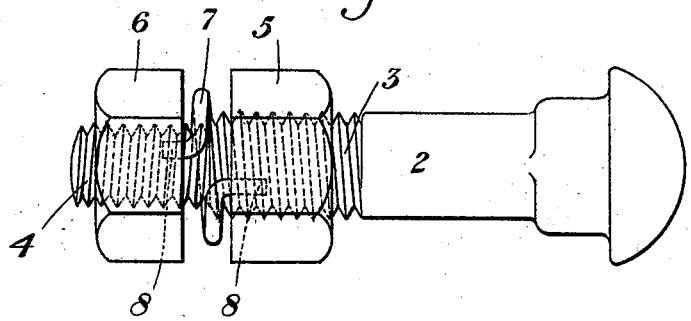
Figure 2:
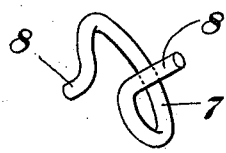
Figure 3:
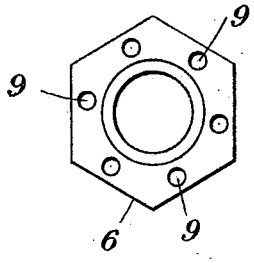
Figure 4:
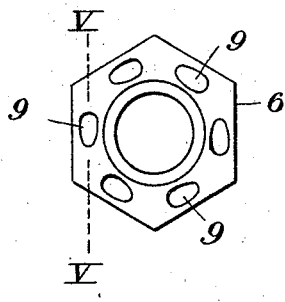
Figure 5:
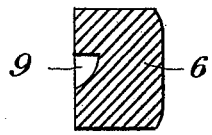

Figure 1 is a side elevation of a bolt furnished with my improved lock. Fig. 2 is a perspective detail view of the locking-spring. Fig. 3 is an inner face view of the follower-nut. Fig. 4 is a similar view, but showing the sockets elongated and sloping upwardly. Fig. 5 is a cross-section on the line V V of Fig. 4.

Similar numerals of reference refer to like parts wherever used throughout this specification.

My invention consists of a locking device for nuts designed to be used in combination with a power-nut screwed upon a right-hand threaded and a follower-nut screwed upon a left-hand threaded extension of the bolt, the device consisting of a coiled spring having its free ends inserted in the power and follower nut, respectively, and adapted to impart rotary motion to the follower-nut in the same direction as the power-nut and to check such motion of the power-nut by compressing the spring.

Referring to the drawings, 2 is a bolt having nearest its head a right-hand thread 3, the outer end being provided with a left-hand thread 4 of reduced diameter.

5 is the usual power-nut employed with bolts, and 6 is a follower-nut having a left-hand thread to correspond with the thread of the outer end of the bolt.

7 is a coiled spring, preferably of wire, having oppositely-extended ends 8, one of which is inserted in a hole in the power-nut, leaving the other end free.

The nut 6 is provided on its inner face with a series of holes or sockets 9, into which one of the ends 8 will be sprung when the follower-nut is screwed down sufficiently far, the other end being inserted in a similar hole in the power-nut.

When the power-nut has been screwed home, and the follower-nut is thus adjusted with the intervening spring in position, any tendency of the power-nut to unscrew will result in tightening the spring and eventually causing the follower-nut to be rotated in the same direction as the power-nut, which, by reason of the reversal of the threads, will cause it to approach the power-nut, compressing the spring and effectually counteracting such tendency of the power-nut to unscrew.

To facilitate the adjustment of the follower-nut, the side of the socket 9 which is advanced against the end 8 of the spring may be sloped upwardly, allowing the nut to ride over such end until it is firmly seated in the proper hole, the opposite side of the socket being straight, as shown in Fig. 5, thus effectually preventing the removal of the follower-nut until the spring is pried out of engagement or broken.

Having described my invention, what I claim is—

In combination with a bolt provided with a right-hand thread 3 and a left-hand thread 4, an externally-flat-faced power-nut 5 upon the thread 3, and a coiled-wire spring 7 provided with an end 8 permanently inserted in a hole in the flat face of the power-nut, and an oppositely-extending free end, an internally-flat-faced follower-nut 6 upon the left-hand thread provided with a series of concentric incline-sided holes adapted to engage the free end of the spring, substantially as set forth.

In testimony whereof I have hereunto set my hand this 2d day of July, 1896.

WILLIAM A. GREEN.

Witnesses:
PETER J. EDWARDS,
C. M. CLARKE.